United States Patent
Christoffersson et al.

(10) Patent No.: US 9,083,405 B2
(45) Date of Patent: Jul. 14, 2015

(54) UPLINK SWITCHED ANTENNA TRANSMIT DIVERSITY METHOD AND APPARATUS

(75) Inventors: Jan Christoffersson, Luleå (SE); Mårten Ericson, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 210 days.

(21) Appl. No.: 13/703,401

(22) PCT Filed: Jun. 29, 2010

(86) PCT No.: PCT/SE2010/050744
§ 371 (c)(1),
(2), (4) Date: Dec. 11, 2012

(87) PCT Pub. No.: WO2012/002851
PCT Pub. Date: Jan. 5, 2012

(65) Prior Publication Data
US 2013/0095869 A1    Apr. 18, 2013

(51) Int. Cl.
H04B 1/44 (2006.01)
H04B 7/06 (2006.01)

(52) U.S. Cl.
CPC ............ *H04B 7/0608* (2013.01); *H04B 7/061* (2013.01)

(58) Field of Classification Search
CPC ................................................. H04B 7/0608
USPC ................................. 455/78, 560, 562.1, 103
See application file for complete search history.

(56) References Cited

U.S. PATENT DOCUMENTS

| 6,175,334 B1 | 1/2001 | Vannatta et al. |
| 6,360,088 B1 | 3/2002 | Shi et al. |
| 8,774,736 B2 * | 7/2014 | Choi et al. ............... 455/101 |

FOREIGN PATENT DOCUMENTS

EP    1919099 A1    5/2008

* cited by examiner

*Primary Examiner* — Eugene Yun
(74) *Attorney, Agent, or Firm* — Murphy, Bilak & Homiller, PLLC

(57) ABSTRACT

A first wireless communication device is in communication with a second wireless communication device over an uplink communication link from the first wireless communication device to the second wireless communication device. Adaptive uplink antenna switching is performed at the first wireless communication device by switching between at least two antennas at the first wireless communication device in accordance with at least one antenna switching parameter to support the uplink communication link, determining whether each antenna switch is successful or unsuccessful and accumulating a history of successful and unsuccessful antenna switches. The at least one antenna switching parameter is modified based on the accumulated history of successful and unsuccessful antenna switches.

21 Claims, 4 Drawing Sheets

UPLINK SWITCHED ANTENNA TRANSMIT DIVERSITY METHOD AND APPARATUS

TECHNICAL FIELD

The present invention relates generally to switched antenna transmit diversity for uplink transmissions, and particularly to adaptive switched antenna transmit diversity for uplink transmissions.

BACKGROUND

Antenna diversity is a wireless diversity scheme that uses two or more antennas to improve the quality and reliability of a wireless link. Currently 3GPP (3rd Generation Partnership Project) is evaluating uplink (UL) transmission diversity techniques to enhance the uplink capacity and UE (user equipment) power consumption. One of the techniques is referred to as Switched Antenna TX Diversity (SATD), where the UE transmits from one of two different antennas at each time instance. The gain from SATD stems from the diversity gain that is experienced due to the different transmit antennas, and by using the antenna with higher gain, lower transmission power is needed to reach the desired SIR (signal-to-interference ratio) target. For an interference-limited system, lower transmission power results in lower interference between cells (i.e. inter-cell interference), which may lead to higher cell throughput. For a power limited UE, the diversity gain corresponds to coverage gain.

An open loop SATD algorithm typically selects transmitting antennas based on TPC (transmit power control) commands e.g. by switching antennas when a cumulative TPC sum is greater than a target sum ($S_{TPC}$) and/or a antenna switch interval based switch e.g. by always switching after $T_{f\text{-}s}$ consecutive transmissions on the same antenna. TPC commands can be used to determine which UE antenna is preferable, e.g. TPC down commands after switching from one antenna to another imply that a better antenna has been chosen while TPC up commands imply that an inferior antenna has been selected. Several TPC up commands while on the same antenna also implies that the antenna gain is deteriorating and that a switch may be beneficial.

The use of a timer-based switch ensures the UE is not relegated to using an inferior antenna. This can happen when the transmission conditions associated with the selected antenna are fairly constant while the transmission conditions for the other antenna are improving. Without a timer-based switch it is difficult to discover that the other antenna is better than the selected antenna.

Optimal values of the parameters for both the TPC-based switch algorithm and the timer-based switch algorithm depend on channel conditions, user speed and antenna implementation. Often the channel conditions and/or gain can differ significantly between antennas e.g. by up to 10 dB. For example, a fixed imbalance between UL transmit antennas of 0 dB or 4 dB has been used in 3GPP evaluations. Added to the fixed imbalance is a random (per UE) imbalance with standard deviation of 2.25 dB in 3GPP evaluations.

As such, it is not uncommon or unrealistic that there is a large difference between the gains on the different antennas. The conventional UL SATD algorithms described above can perform well under certain conditions. Accordingly, transmission power can be decreased efficiently. However, these conventional UL SATD algorithms are not designed for optimizing cell throughput. As such, the data rate never reaches its possible maximum level.

SUMMARY

When a switch is made to an antenna with large gain difference, a large (but short) noise rise peak occurs. The noise rise peak has the effect of increasing other loads which in turn decreases scheduling headroom. This results in the selection of lower TFCs (Transport Format Combinations) which yields undesirable lower bitrates. Indeed, noise rise peaks can occur so frequently that the TFC selection never recovers. Noise rise peaks typically occur for UEs that have a large long-term gain difference between the antennas, e.g. if the second antenna on average has worse antenna gain compared to the first antenna. The slow increase of TFC in combination with the frequent noise rise peaks results in a significant amount of the data being transmitted using a low TFC (i.e. with low data rate). According to the embodiments described herein, the antenna switching interval for uplink transmissions is adapted based on the history or successful and unsuccessful antenna switches to minimize noise rise peaks from unsuccessful antenna switches while maintaining a suitably high switch rate to ensure the best antenna is used as often as possible. Accordingly, user channel conditions and long-term differences between antennas affect the switching strategy for individual users.

According to an embodiment of a method of performing adaptive uplink antenna switching, a first wireless communication device is in communication with a second wireless communication device over an uplink communication link from the first wireless communication device to the second wireless communication device. The method includes switching between at least two antennas at the first wireless communication device in accordance with at least one antenna switching parameter to support the uplink communication link, determining whether each antenna switch is successful or unsuccessful and accumulating a history of successful and unsuccessful antenna switches. The at least one antenna switching parameter is modified based on the accumulated history of successful and unsuccessful antenna switches.

According to an embodiment of a wireless communication device, the device includes at least two antennas, an antenna switching module and an analysis module. The antenna switching module is operable to switch between the at least two antennas in accordance with at least one antenna switching parameter to support an uplink communication link from the wireless communication device to another wireless communication device. The analysis module is operable to determine whether each antenna switch is successful or unsuccessful, accumulate a history of successful and unsuccessful antenna switches, and modify the at least one antenna switching parameter based on the accumulated history of successful and unsuccessful antenna switches.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
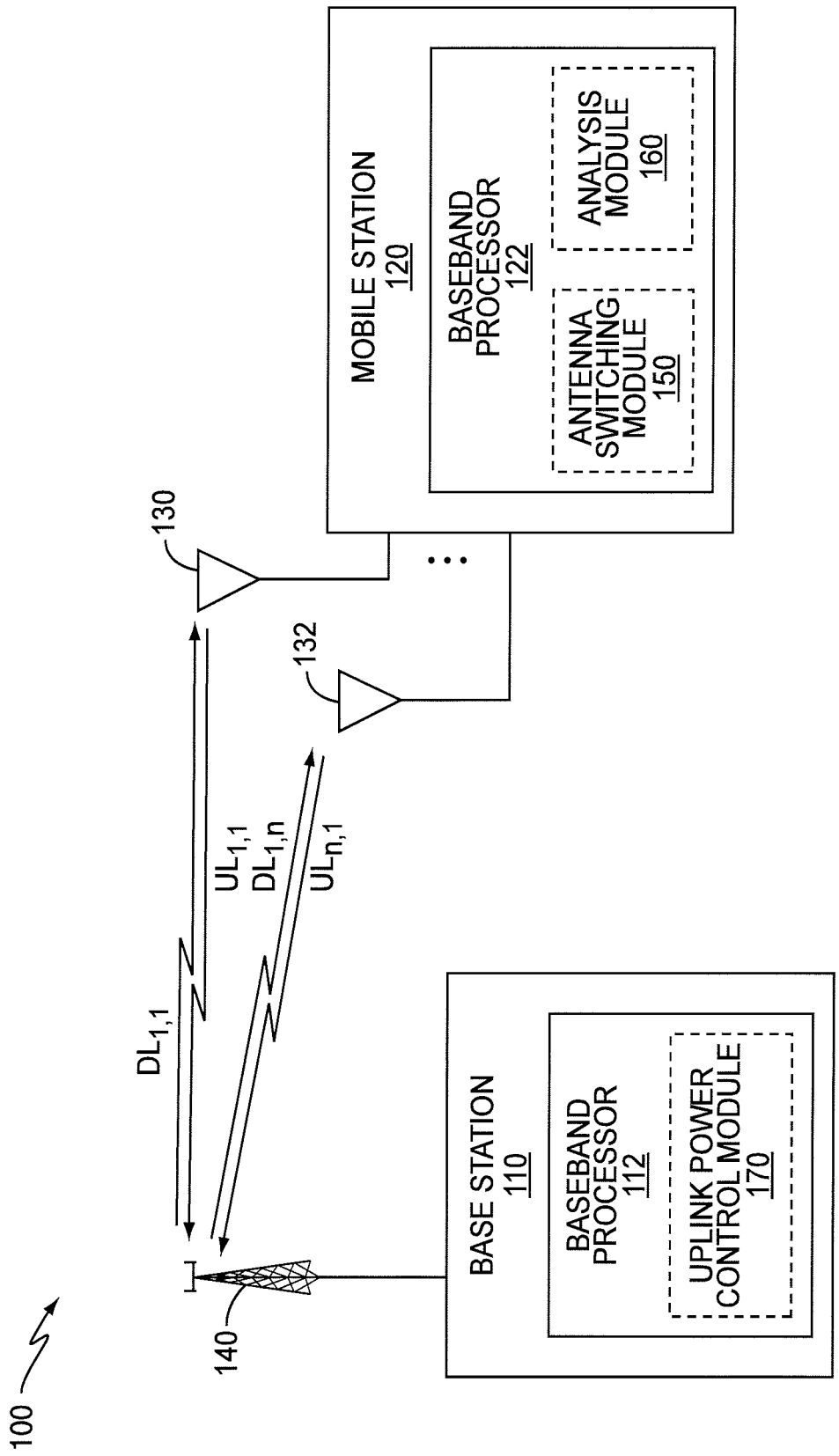
FIG. 1 illustrates an embodiment of a wireless communication network including a base station serving a mobile station that implements adaptive uplink antenna switching.

FIG. 1 illustrates an embodiment of a wireless communication network 100 including a base station 110 serving a mobile station 120, alternatively referred to as e.g. user equipment (UE) or a mobile terminal. The base station 110 and the mobile station 120 each have a respective baseband processor 112, 122 for implementing the wireless protocol stacks and performing signal processing tasks that enable wireless communication. The mobile station 120 has at least two antennas 130, 132 for communicating with the base station 110 in the downlink (DL) direction (i.e. from the base station to the mobile station) and in the uplink (UL) direction (i.e. from the mobile station to the base station). FIG. 1 shows the mobile station 120 has n antennas, the antennas 130, 132 enabling a communication downlink and a communication uplink with one or more antennas 140 at the base station 110. Adaptive uplink antenna switching is implemented at the mobile station 120 to ensure optimal cell throughput and data rates for the region serviced by the base station 110. To this end, the mobile station 120 includes an antenna switching module 150 and an analysis module 160 included in or associated with the mobile station baseband processor 122.

Figure 2:
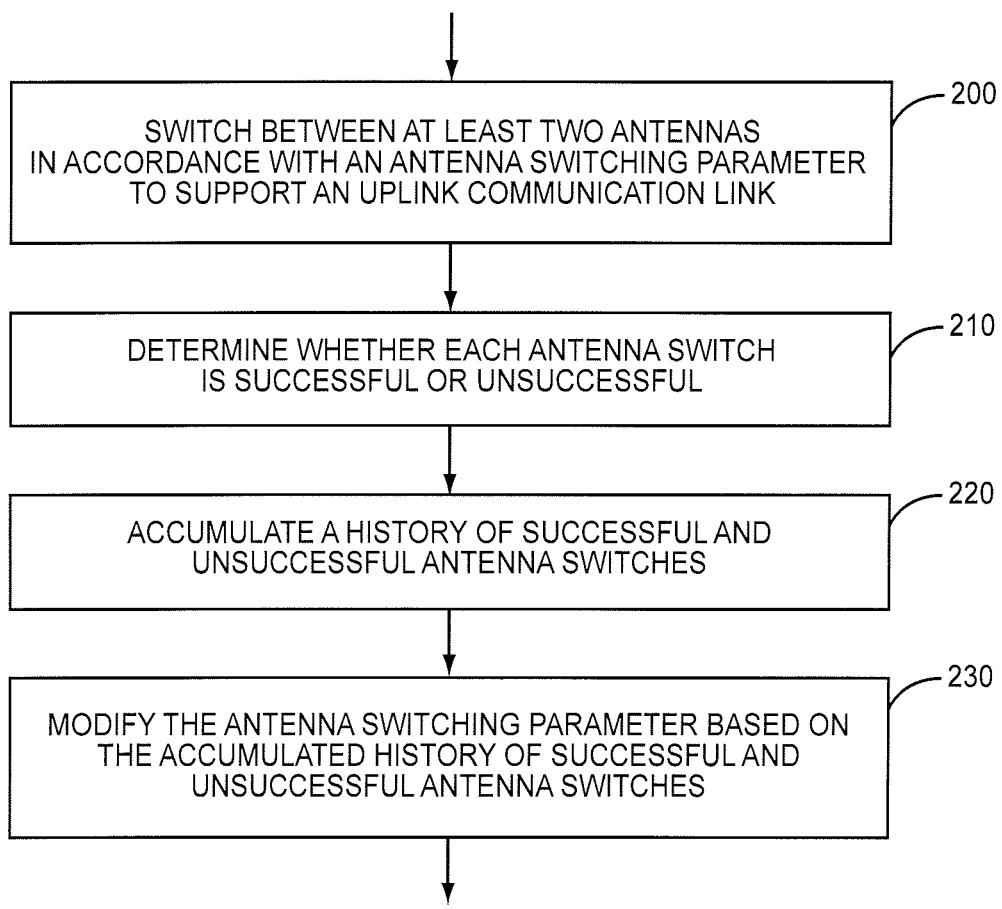
FIG. 2 illustrates an embodiment of a method of performing adaptive uplink antenna switching.

FIG. 2 illustrates an embodiment of a method of adaptive uplink antenna switching implemented by the antenna switching module 150 and the analysis module 160. The antenna switching module 150 occasionally switches between at least two antennas 130, 132 of the mobile station 120 in accordance with at least one antenna switching parameter to support an uplink communication link from the mobile station 120 to the base station 110 (Step 200). According to an embodiment, the antenna switching parameter is a predetermined antenna switch interval $T_{f-s}$, a predetermined threshold $S_{TPC}$ which is a function of one or more transmit power control (TPC) commands received at the wireless communication device, both parameters, or some other suitable parameter or combination of parameters. With regard to the predetermined switch threshold $S_{TPC}$, the base station 110 includes an uplink power control module 170 for controlling the power level of the uplink communication link from the mobile station 120 to the base station 110. The uplink power control module 170 generates TPC commands based on channel conditions, interference, etc. and the base station 110 transmits the TPC commands to the mobile station 120. In response, the mobile station 120 adjusts the uplink transmission power accordingly. For example, a TPC command may indicate an increase or decrease in the uplink transmit power is warranted. The mobile station 120 adjusts the uplink transmission power based on an analysis of the received TPC commands as is well known in the art e.g. using the so-called open loop algorithm. The mobile station 120 can also use the TPC commands to determine whether to adjust the predetermined antenna switch threshold $S_{TPC}$ as described in more detail later herein.

In response to an antenna switch at the mobile station, the analysis module 160 determines whether the antenna switch is successful or unsuccessful by determining if the new antenna is better (Step 210). The analysis module 160 can determine if the new antenna is better e.g. based on whether the channel conditions become worse for the new antenna. The switch can also be deemed successful if a switch back to the previous antenna does not occur within the first few frames, e.g. the first 2-10 frames. In one embodiment, the analysis module 160 determines the antenna switch is unsuccessful if the first TPC command received at the mobile device 120 after switching antennas indicates an increase in uplink transmit power. In the following example, the stated probabilities pertain to scenarios where fast fading is not considered or is constant. Practically speaking, the fast fading causes gain change from slot-to-slot, but has less effect on the gain change as compared with switching to antenna with very different gain. With this understanding, if the antennas have the same properties, there is a 50% chance that the new antenna is deemed inferior if the TPC command threshold is +1. If the new antenna has a 2 dB lower gain, then the chance of concluding that the new antenna is inferior increase to almost 100% because the 2 dB drop would result in TPC=+1. However, if the new antenna has a 2 dB higher gain then the chance of concluding that the new antenna is inferior approaches 0% because the 2 dB jump would result in TPC=−1. As such, the use of a single TPC command to determine whether an uplink antenna switch is successful or not can result in errors although it provides a very quick determination.

In another embodiment, the analysis module 160 determines whether the antenna switch is successful or unsuccessful based on a plurality of TPC commands received at the mobile station 120 after the antenna switch. The analysis module 160 can perform any meaningful statistical analysis, e.g. an average of the TPC commands over an observation window, weighted average, etc. For example, the analysis module 160 could compute the sum or average of e.g. the last 5 TPC commands. The threshold to which the result is compared to is determined based on the number of TPC commands used when computing the function, the function itself (e.g. the sum, average, etc.) and the desired confidence level. Accordingly, the analysis module 160 performs some sort of statistical significance test. If the number of TPC commands used as part of the analysis changes, the threshold can be changed accordingly if the same statistical properties are desired.

In yet another embodiment, the analysis module 160 determines whether each antenna switch is successful or unsuccessful based on signaling received from the base station 110 indicating uplink signal quality. According to this embodiment, the base station 110 determines if antenna switches at the mobile station are successful or not and communicates this information to the mobile station 120 e.g. over a separate signaling channel so that the mobile station 120 is aware of the exact time slot when antenna switches are made.

In each case, the analysis module 160 accumulates a history of successful and unsuccessful antenna switches at the mobile station 120 (Step 220). The analysis module 160 modifies each antenna switching parameter based on the accumulated history of successful and unsuccessful antenna switches (Step 230), thereby enabling adaptive uplink antenna switching at the mobile station 120. The antenna switching is adaptive in that each antenna switching parameter employed can be revised based on a history of uplink antenna switches at the mobile station 120.

In one embodiment, the success rate for different types of antenna switches is tracked to accumulate a history of successful and unsuccessful uplink antenna switches. For example, if it is observed that with a specific forced switch interval, the rate of successful switches from a first antenna 130 to a second antenna 132 is very high, then the switching interval for this type of switch event can be lowered. Similarly, if a certain threshold for the cumulative TPC sum leads to a low success rate when switching from the second antenna 132 to the first antenna 130, the threshold for this switch can be increased. Still other variations are encompassed by the embodiments described herein.

Figure 3:
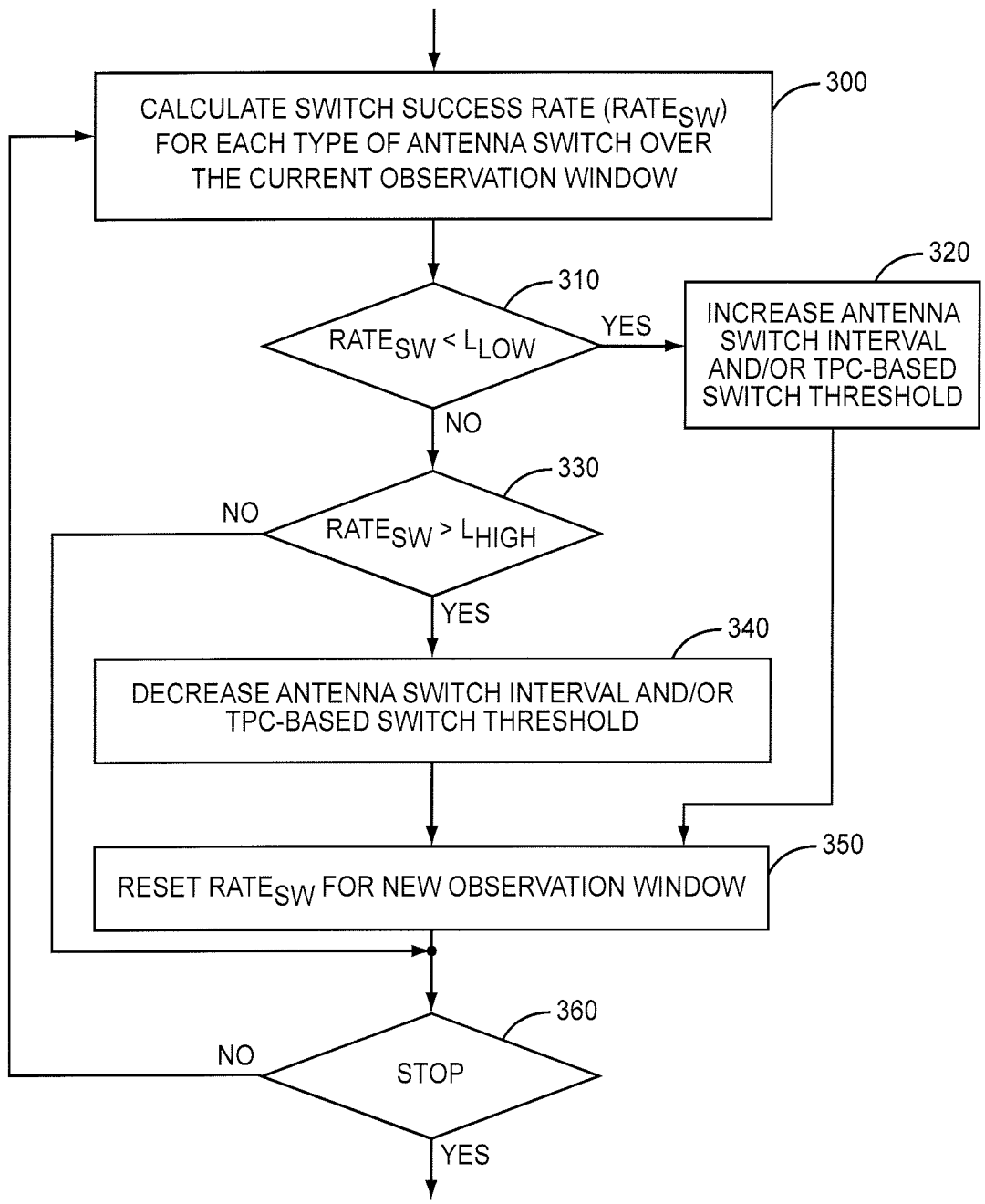
FIG. 3 illustrates another embodiment of a method of tracking the success rate of uplink antenna switches.

FIG. 3 illustrates an embodiment of a method of tracking the success rate for different types of antenna switches at the mobile station 120. The analysis module 160 computes an antenna switch success rate $RATE_{SW}$ indicating the likelihood of a successful antenna switch from a first one of the mobile station antennas to a second one of the mobile station antennas over an observation interval to accumulate a history of successful and unsuccessful antenna switches for the observation window (Step 300). The antenna switch $RATE_{SW}$ corresponds to the rate at which the switch from the one antenna to another antenna was successful over the observation window. In a purely illustrative example, $RATE_{SW}$=50% if the switch from one antenna to the other antenna is successful half the time over the observation window.

The analysis module 160 determines whether to increase the predetermined antenna switch interval $T_{f-s}$ and/or the predetermined switch threshold $S_{TPC}$ based on the antenna switch success rate $RATE_{SW}$ (Step 310). The analysis module 160 increases the predetermined antenna switch interval $T_{f-s}$ and/or the predetermined switch threshold $S_{TPC}$ if $RATE_{SW}$ is below a first limit ($L_{low}$) (Step 320). If the antenna switch success rate $RATE_{SW}$ is above the first limit ($L_{low}$), the analysis module 160 then determines whether to decrease the predetermined antenna switch interval $T_{f-s}$ and/or the predetermined switch threshold $S_{TPC}$ (Step 330). The analysis module 160 decreases the predetermined antenna switch interval $T_{f-s}$ and/or the predetermined switch threshold $S_{TPC}$ if $RATE_{SW}$ is above a second limit ($L_{high}$) (Step 340). The analysis module 160 reinitializes the antenna switch success rate $RATE_{SW}$ for a new observation interval if the predetermined antenna switch interval $T_{f-s}$ and/or the predetermined switch threshold $S_{TPC}$ was increased or decreased during the previous observation window (Step 350). This way, the history of successful and unsuccessful antenna switches accumulated for prior observation intervals do not contribute to the success rate calculated for the new observation interval. The mobile device 120 then determines whether to perform the analysis over another observation window (Step 360).

The predetermined antenna switch interval $T_{f-s}$ and/or the predetermined antenna switch threshold $S_{TPC}$ can be different for switching from one of the mobile station antennas to a second one of the mobile stations than for switching from the second antenna to the first antenna. For example, the mobile station starts with a default switch interval of $T_{f-s}$ and a default switch threshold $S_{TPC}$. The same $T_{f-s}$ and/or the same $S_{TPC}$ can be used to switch from the first antenna 130 to the second antenna 132 and from the second antenna 132 to the first antenna 130. Alternatively, a different $T_{f-s}$ and/or a different $S_{TPC}$ can be used to switch from the first antenna 130 to the second antenna 132 than from the second antenna 132 to the first antenna 130. Therefore, at least four types of antenna switches are possible according to this embodiment for each possible pair of uplink transmit antennas: a forced switch from antenna 1 to antenna 2 every $T_{f-s}$ ms; a forced switch from antenna 2 to antenna 1 every $T_{f-s}$ ms; a switch based on threshold $S_{TPC}$ from antenna 1 to antenna 2; and a switch based on threshold $S_{TPC}$ from antenna 2 to antenna 1.

When the switch has been classified, the success rate for this type of switch is computed. The rate can be determined using a sliding window based on the n latest switches of the specific type. If the switch success rate is below first limit $L_{low}$, this switch does not produce successful switches at an acceptable rate and the antenna switch interval $T_{f-s}$ or threshold $S_{TPC}$ is increased for this switch type as described previously herein. As such, the number of switches to the inferior antenna is decreased. If the switch success rate is above second limit $L_{high}$, this switch produces successful switches at a very high or possibly too high rate and the antenna switch interval $T_{f-s}$ or threshold $S_{TPC}$ is decreased as previously described herein to ensure that the inferior antenna is not used for too long a period. At each change of the switch interval or threshold the calculation of rate for this type of antenna switch can be restarted. As such, the success rate preferably does not take switches done with the old switch interval or threshold into account.

The embodiments previously described herein implement the adaptive uplink antenna switching entirely at the mobile station 120. That is, the antenna switching module 150 and the analysis module 160 included in or associated with the mobile station baseband processor 122 implement the adaptive uplink antenna switching. In other embodiments, at least the analysis portion of the adaptive uplink antenna switching is performed at the base station 110.

Figure 4:
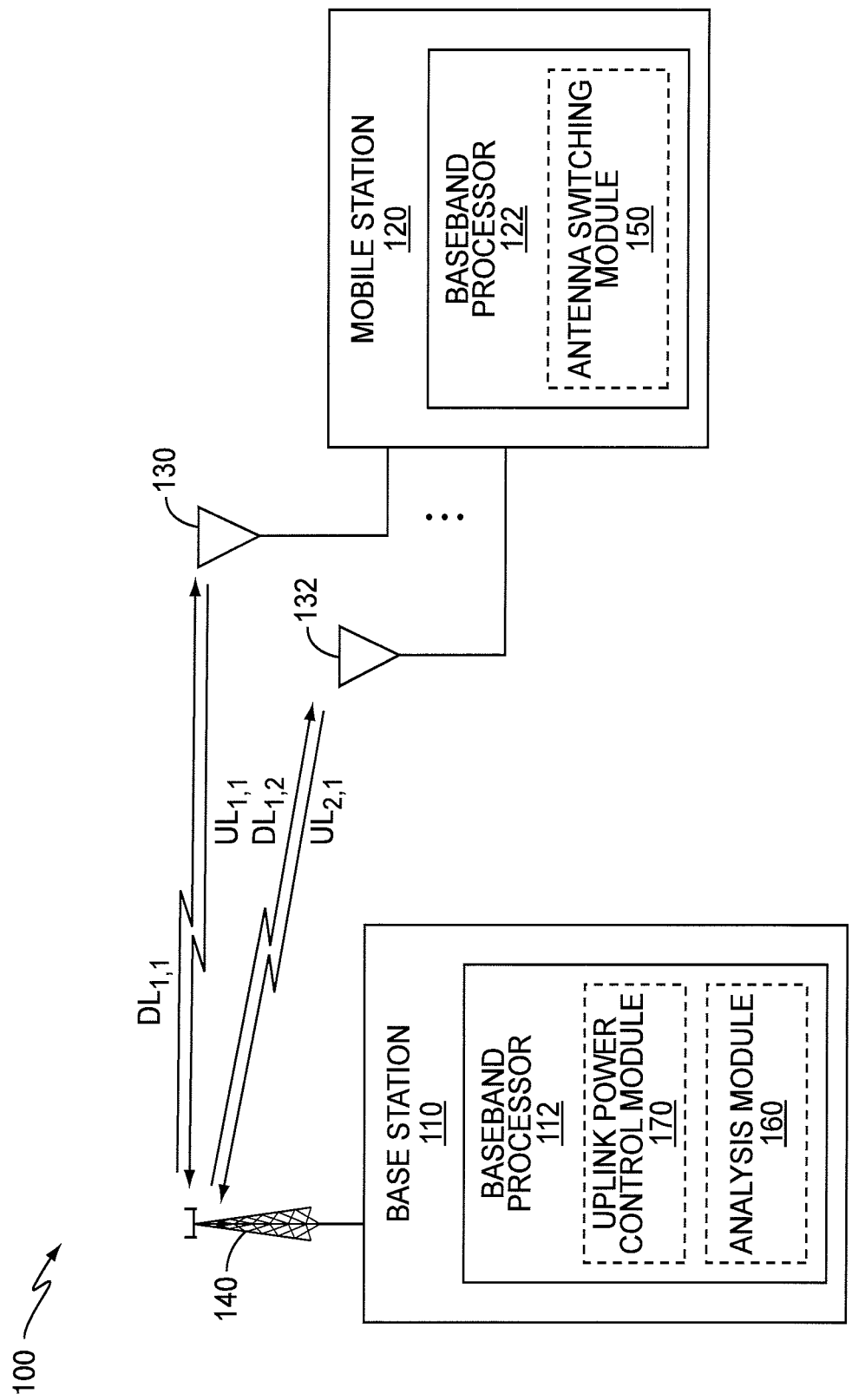
FIG. 4 illustrates another embodiment of a wireless communication network including a base station serving a mobile station that implements adaptive uplink antenna switching.

FIG. 4 illustrates another embodiment of the wireless communication network 100 where the base station 110 and the mobile station 120 are similar to those shown in FIG. 1, except the analysis module 160 is included in or associated with the baseband processor 112 of the base station 110 instead of the mobile station baseband processor 122. As such, it is the base station 110 that determines whether antenna switches performed at the mobile station 120 are successful or unsuccessful and accumulates a history of successful and unsuccessful antenna switches at the mobile wireless device 120. The base station 110 also modifies each antenna switching parameter used at the mobile station 120 for controlling uplink antenna switches based on the accumulated history of successful and unsuccessful antenna switches. The base station 110 sends antenna switch commands to the mobile station 120 which include new antenna switching parameter values. In one embodiment, the base station 110 sends the antenna switch commands and the new antenna switching parameters to the mobile station 120 using HS-SCCH (High Speed Shared Control CHannel) orders. Accordingly, the mobile station 120 is aware of the exact time slot when antenna switches are made. The antenna switching module 150 at the mobile station 120 implements adaptive uplink antenna switching between at least two antennas 130, 132 of the mobile station 120 in accordance with the antenna switch commands received from the base station 110. As such, the adaptive uplink antenna switching embodiments described herein can be used at the mobile station 120 or the base station 110 depending on which entity makes the switching decisions.

The adaptive uplink antenna switching embodiments described herein minimize the noise rise peaks resulting from erroneous antenna switches. The impact of an erroneous antenna switch is most severe in the common case when a mobile station such as a UE has one antenna that is on average substantially worse than the other antenna. Since noise rise peaks result in decreased capacity, the adaptive uplink antenna switching embodiments described herein increase capacity (i.e. cell throughput) when SATD or other uplink switched antenna transmit diversity techniques are applied. The adaptive uplink antenna switching embodiments described herein also optimize the time spent on each antenna before changing antenna. This also yields capacity improvements.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of performing antenna switching at a first wireless communication device in communication with a second wireless communication device over an uplink communication link from the first wireless communication device to the second wireless communication device, the method comprising:
    switching between at least two antennas at the first wireless communication device in accordance with at least one antenna switching parameter to support the uplink communication link;
    determining whether each antenna switch is successful or unsuccessful;
    accumulating a history of successful and unsuccessful antenna switches; and
    modifying the at least one antenna switching parameter based on the accumulated history of successful and unsuccessful antenna switches.

2. The method of claim 1, wherein the at least one antenna switching parameter comprises a predetermined antenna switch interval, or a predetermined threshold that is a function of one or more transmit power control commands received at the first wireless communication device, or both.

3. The method of claim 2, wherein at least one of the predetermined antenna switch interval and the predetermined threshold is different for switching from a first one of the at least two antennas to a second one of the at least two antennas than for switching from the second antenna to the first antenna.

4. The method of claim 2, comprising determining an antenna switch is unsuccessful if the first transmit power control command received at the first wireless communication device after the antenna switch indicates an increase in uplink transmit power.

5. The method of claim 2, comprising determining whether an antenna switch is successful or unsuccessful based on a plurality of the transmit power control commands received at the first wireless communication device after the antenna switch.

6. The method of claim 2, wherein the accumulated history of successful and unsuccessful antenna switches corresponds to an antenna switch success rate that indicates the likelihood of a successful antenna switch from a first one of the at least two antennas to a second one of the at least two antennas over an observation interval.

7. The method of claim 6, comprising:
    increasing at least one of the predetermined antenna switch interval and the predetermined threshold if the antenna switch success rate from the first antenna to the second antenna is below a first limit; and
    decreasing at least one of the predetermined antenna switch interval and the predetermined threshold if the antenna switch success rate from the first antenna to the second antenna is above a second limit.

8. The method of claim 6, further comprising reinitializing the antenna switch success rate for a new observation interval if at least one of the predetermined antenna switch interval and the predetermined threshold is increased or decreased so that the history of successful and unsuccessful antenna switches accumulated for a prior observation interval does not contribute to the success rate calculated for the new observation interval.

9. The method of claim 1, wherein the first wireless communication device is a mobile station and the second wireless communication device is a base station.

10. The method of claim 9, comprising switching between at least two antennas at the mobile station in accordance with antenna switch commands received from the base station.

11. The method of claim 9, comprising determining whether each antenna switch is successful or unsuccessful based on signaling received at the mobile station from the base station indicating uplink signal quality.

12. A wireless communication device, comprising:
    at least two antennas;
    an antenna switching module operable to switch between the at least two antennas in accordance with at least one antenna switching parameter to support an uplink communication link from the wireless communication device to another wireless communication device; and
    an analysis module operable to determine whether each antenna switch is successful or unsuccessful, accumulate a history of successful and unsuccessful antenna switches, and modify the at least one antenna switching parameter based on the accumulated history of successful and unsuccessful antenna switches.

13. The wireless communication device of claim 12, wherein the antenna switching module is operable to switch between the at least two antennas in accordance with a predetermined antenna switch interval, or a predetermined threshold that is a function of one or more transmit power control commands received at the wireless communication device, or both.

14. The wireless communication device of claim 13, wherein at least one of the predetermined antenna switch interval and the predetermined threshold is different for switching from a first one of the at least two antennas to a second one of the at least two antennas than for switching from the second antenna to the first antenna.

15. The wireless communication device of claim 13, wherein the analysis module is operable to determine an antenna switch is unsuccessful if the first transmit power control command received at the wireless communication device after the antenna switch indicates an increase in uplink transmit power.

16. The wireless communication device of claim 13, wherein the analysis module is operable to determine whether an antenna switch is successful or unsuccessful based on a plurality of the transmit power control commands received at the wireless communication device after the antenna switch.

17. The wireless communication device of claim 13, wherein the accumulated history of successful and unsuccessful antenna switches corresponds to an antenna switch success rate that indicates the likelihood of a successful antenna switch from a first one of the at least two antennas to a second one of the at least two antennas over an observation interval.

18. The wireless communication device of claim 17, wherein the analysis module is operable to increase at least one of the predetermined antenna switch interval and the predetermined threshold if the antenna switch success rate from the first antenna to the second antenna is below a first limit and decrease at least one of the predetermined antenna switch interval and the predetermined threshold if the antenna switch success rate from the first antenna to the second antenna is above a second limit.

19. The wireless communication device of claim 17, wherein the analysis module is operable to reinitialize the antenna switch success rate for a new observation interval if at least one of the predetermined antenna switch interval and the predetermined threshold is increased or decreased so that the history of successful and unsuccessful antenna switches accumulated for a prior observation interval does not contribute to the success rate calculated for the new observation interval.

20. The wireless communication device of claim 12, wherein the wireless communication device is a mobile station and the other wireless communication device is a base station.

21. The wireless communication device of claim 20, wherein the analysis module is operable to determine whether each antenna switch is successful or unsuccessful based on signaling received from the base station indicating uplink signal quality.

* * * * *